Feb. 28, 1928.
W. KICHERER
1,660,384
FLOOR POLISHING APPARATUS
Filed June 27, 1927
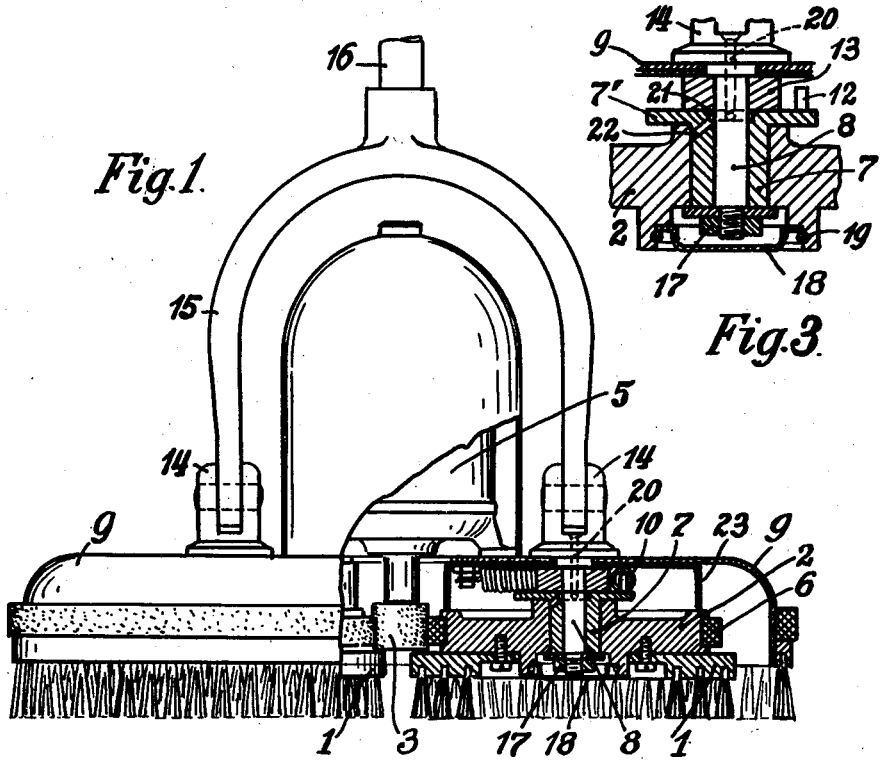
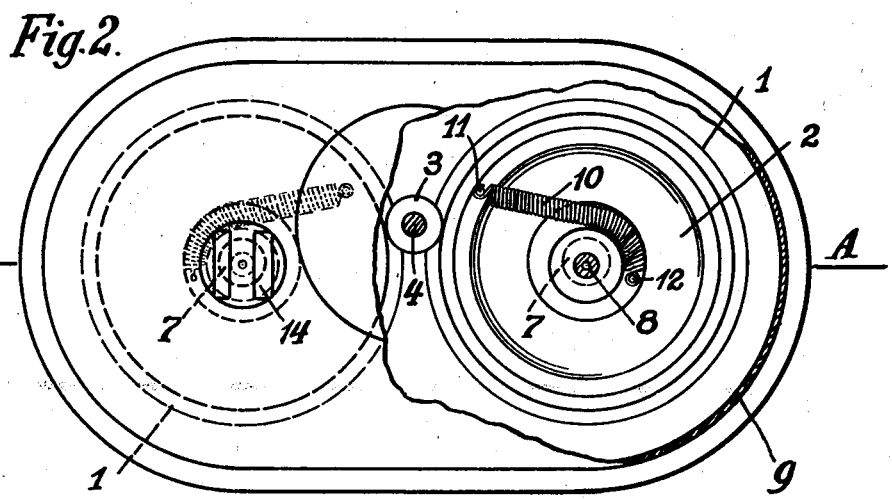
Inventor:
Wilhelm Kicherer Patented Feb. 28, 1928.

1,660,384

UNITED STATES PATENT OFFICE.

WILHELM KICHERER, OF STUTTGART, GERMANY, ASSIGNOR TO THE FIRM JULIUS GEIGER GESELLSCHAFT MIT BESCHRÄNKTER HAFTUNG, OF STUTTGART, GERMANY.

FLOOR-POLISHING APPARATUS.

Application filed June 27, 1927, Serial No. 201,915, and in Germany September 23, 1926.

My invention relates to improvements in floor polishing apparatus of the type with disc shaped brushes rotatable on vertical axles whereby the brushes are driven by friction discs, one of such friction discs being mounted on the driving shaft of a motor, while the friction discs of the brushes are held in yielding contact with the driving disc or roller.

In this type of floor polishers already known the brushes and the appertaining friction discs together with their axles are mounted in levers adapted to swing horizontally and being influenced by a spring or springs.

Such kind of journalling of the friction discs is disadvantageous as it is nearly impossible to hold the friction discs in exact parallel contact with the driving friction roller of the motor. Consequently the touch of the brushes with the floor becomes unequal and incomplete and the apparatus does not work efficiently enough. Further the apparatus is caused to vibrate in all of its parts, especially if the circumferential surfaces of the rims of the friction discs are becoming uneven by adhesion of dust and dirt or after wear of the rims.

For avoiding the aforesaid disadvantages I provide according to my invention in floor polishing apparatus an absolutely correct journalling of the yieldingly adjustable friction discs of the brushes so that the friction discs during their turning motion and during their adjustment will always be held in exact parallel contact with the driving friction roller of the motor, and whereby an equal and full touch of the brushes on the floor is attainable.

A further object of the invention is to secure a perfect lubrication of the axles of the brushes and to protect the bearings against penetrating of dust.

A further object of the invention is to make the moving parts more accessible so that they may be easily demounted when required.

The features of construction, combination and arrangement of parts are hereinafter fully set forth in the following specification, reference being had to the accompanying drawings, in which:

Fig. 1 is a front elevation of the apparatus, nearly the right half of it is shown in section on line A—A of Fig. 2.

Fig. 2 shows a plan view in which at the right half the upper part of the housing is broken away.

Fig. 3 shows the journalling parts of one friction disc and brush in a section like Fig. 1 in an enlarged scale.

In the apparatus two disc-shaped brushes 1 may be provided, which are rotatable in a horizontal plane. Each brush has connected with it a friction disc 2 adapted to be brought in contact with a third friction disc or roller 3 which is secured on the driving shaft 4 of the electro-motor 5 so that it is possible to drive the brushes by the motor simultaneously. The circumferential surfaces of the driving friction roller 3 and of the driven friction discs 2 may be covered by rims 6 of rubber, leather or like material. Each driven friction disc 2 is loosely mounted on a bush 7 having its axle hole excentrically disposed and being rotatably held on the vertical bolt 8 which is secured in the housing 9. In order to press each driven friction disc 2 against the driving roller 3, a spring 10, for instance a coiled spring, is applied. One end of this spring is secured at 11 to the housing 9 while its other end is fixed to the bush 7 by means of a pin 12. Preferably the upper part of the bush 7 forms a disc 7'' to which the pin 12 is secured. A collar 13 extending from the free surface of the bush 7 serves as a guide for the spring 10, which latter is bent round and engages with the collar 13. The collar preferably consists in a special roller loosely mounted on the vertical bolt 8. Each fixed bolt 8 may form with its upper part the joint head 14 for the yoke 15 of the handle-stick 16 of the apparatus. The lower end of the bolt 8 is screwthreaded and receives a nut 17 for securing the bush 7 and therewith the friction disc 2 with the brush 1 in position. A cover 18 detachably held in the boss of the disc 2 by means of a spring-ring 19 will prevent the penetration of dust to the whole bearing parts. Further the cover 18 serves as an oil pan preventing dropping the oil on the floor to be polished.

To lubricate the bearing surfaces of the several parts the bolt 3 has a bore 20 terminating in a ring groove 21 from which a short bore 22 leads through the bush 7 to its outer surface. About the friction disc 2 there may be provided still a special cap 23 including the upper parts of the journalling construction for protecting them against dust.

As it may be understood the friction disc 2 of each rotatable brush 1 will be held yieldingly adjustable against the driving roller 3 with the help of the spring 10 and the excentrical bush 7. As the journalling of the disc and brush is especially perfect, the disc will be always pressed on parallelly to the driving roller 3.

At the lower surface of the housing 9, i. e. at places around and between the rotatable brushes 1 unmovable brushes may be arranged.

I do not want to be limited to the precise details described or shown in the specification and drawings, as many variations will occur to those skilled in the art.

What I claim is:

1. A floor polishing apparatus comprising a housing, a motor driven axle, a driving friction roller fixed on said motor driven axle, a brush, a friction disc connected to said brush and being adapted to be held in contact with the said driving roller, the said friction disc of the said brush having its axle bolt fixed in the said housing of the apparatus, an excentrical bush being loosely mounted on the said fixed axle bolt and loosely mounted in the said friction disc of the said brush, and means for moving the said excentrical bush to force the said friction disc against said driving roller by partial turning of the said excentrical bush on the said fixed axle bolt.

2. A floor polishing apparatus comprising a housing, a motor driven axle, a driving friction roller fixed on said motor driven axle, a brush, a friction disc connected to said brush and being adapted to be held in contact with the said driving roller, the said friction disc of the said brush having its axle bolt fixed in said housing of the apparatus, an excentrical bush being loosely mounted on the said fixed axle bolt and loosely mounted in the said friction disc of the said brush, and spring means for moving the said excentrical bush to force said friction disc against said driving roller by partial turning of the said excentrical bush on the said fixed axle bolt.

In testimony whereof I affix my signature.

WILHELM KICHERER.